United States Patent
Stevenson et al.

(10) Patent No.: US 7,121,603 B2
(45) Date of Patent: Oct. 17, 2006

(54) SLIDING LOAD FLOOR

(75) Inventors: Robin Stevenson, Bloomfield, MI (US); Devadatta M. Kulkarni, Rochester Hills, MI (US); Andrew L. Bartos, Clarkston, MI (US); Teresa U. Holiness, Detroit, MI (US)

(73) Assignee: General Motors Corporation, Detroit, MI (US)

( * ) Notice: Subject to any disclaimer, the term of this patent is extended or adjusted under 35 U.S.C. 154(b) by 32 days.

(21) Appl. No.: 11/009,528

(22) Filed: Dec. 10, 2004

(65) Prior Publication Data

US 2006/0125267 A1    Jun. 15, 2006

(51) Int. Cl.
B62D 27/00    (2006.01)

(52) U.S. Cl. .................................. 296/26.09; 296/37.6

(58) Field of Classification Search ............. 296/26.09, 296/37.1, 37.6; 414/522
See application file for complete search history.

(56) References Cited

U.S. PATENT DOCUMENTS

| | | | | |
|---|---|---|---|---|
| 3,768,673 A | * | 10/1973 | Nydam et al. ............... | 414/522 |
| 4,681,360 A | * | 7/1987 | Peters et al. ............... | 296/37.6 |
| 4,824,158 A | * | 4/1989 | Peters et al. ............... | 296/37.6 |
| 4,993,088 A | * | 2/1991 | Chudik ..................... | 296/26.09 |
| 5,513,941 A | | 5/1996 | Kulas et al. ................ | 414/522 |
| 5,829,945 A | * | 11/1998 | Stanley .................... | 296/26.09 |
| 5,934,725 A | | 8/1999 | Bowers .................... | 296/26.09 |
| 6,120,075 A | | 9/2000 | Terry ...................... | 296/26.09 |
| 6,253,976 B1 | * | 7/2001 | Coleman et al. ............ | 224/404 |
| 6,312,034 B1 | | 11/2001 | Coleman, II et al. ...... | 296/26.1 |
| 6,318,780 B1 | * | 11/2001 | St. Aubin ................. | 296/26.09 |
| 6,390,525 B1 | | 5/2002 | Carpenter et al. ........ | 296/26.09 |
| 6,398,283 B1 | | 6/2002 | Knudtson et al. ......... | 296/26.09 |
| 6,464,274 B1 | * | 10/2002 | Mink et al. ............... | 296/26.09 |
| 6,503,036 B1 | | 1/2003 | Bequette et al. .............. | 410/94 |
| 6,659,524 B1 | | 12/2003 | Carlson .................... | 296/26.09 |
| 2002/0180231 A1 | * | 12/2002 | Fox ........................ | 296/26.01 |

* cited by examiner

Primary Examiner—Lori L. Coletta
(74) Attorney, Agent, or Firm—Kathryn A. Marra

(57) ABSTRACT

A sliding load floor assembly for a motor vehicle comprises a sliding platform configured to receive a load floor and slidable along a support frame fixed to the vehicle. The support frame includes upper and lower flanges. An axle extends outward from the sliding platform, with a roller rotatably attached thereto and movable along the upper and lower flanges. The roller configuration elevates the sliding platform above a vehicle floor, while allowing the sliding platform the move between a stowed position and an extended position. A wedge is configured to exert a vertical force upon a portion of the sliding platform in the stowed position, thereby preventing vertical movement of the roller to reduce vibration. At least one detent member and at least one latch member are selectively engageable with one another to restrict movement of the sliding platform with respect to the support rail.

16 Claims, 5 Drawing Sheets

SLIDING LOAD FLOOR

TECHNICAL FIELD

The present invention relates to sliding load floors for motor vehicles, and more particularly to a sliding load floor assembly wherein a load floor is translatable between a stowed position and an extended position.

BACKGROUND OF THE INVENTION

Many vehicles, such as pickup trucks, include a cargo area for transporting cargo. In a pickup truck, for example, the cargo area is a cargo-carrying box, also known as a "pickup box" or "pickup bed," typically constructed with a front wall, two sidewalls and a tailgate, all of which are of substantially equal height and whose top edges are high off the ground.

The tailgate is selectively pivotable between a closed position and an open position. In the closed position, the tailgate is generally vertically oriented to close a rear cargo box opening. In the open position, the tailgate is generally horizontally oriented so as not to obstruct the opening and allow access to the cargo area from the rear of the pickup box. Other vehicles, such as sport-utility vehicles and minivans, also include a cargo area accessible through a rear body opening.

SUMMARY OF THE INVENTION

A sliding load floor assembly for a motor vehicle comprises a platform slidable along a support frame. The support frame is mountable to the vehicle, and includes a support rail with upper and lower flanges. A plurality of rollers is attached to the platform and is supported on the lower flange to elevate the sliding platform above a vehicle floor. The rollers are rotatable and are guided by the lower flange to enable selective movement of the platform between a stowed position and an extended position.

In a preferred embodiment, a wedge is configured to exert a vertical force upon a portion of the platform, or a member affixed thereto, when the sliding platform is in the stowed position, thereby preventing vertical movement of the roller to reduce vibration. An adjustment slot allows selective variation in the fore/aft position of the wedge and, correspondingly, the amount of force exerted by the wedge on the platform.

In the preferred embodiment, a portion of the platform extends above the rail and the flanges to prevent debris from falling onto the path of the rollers. The rail defines a channel that is open at the rear of the vehicle to facilitate debris removal from the rail.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
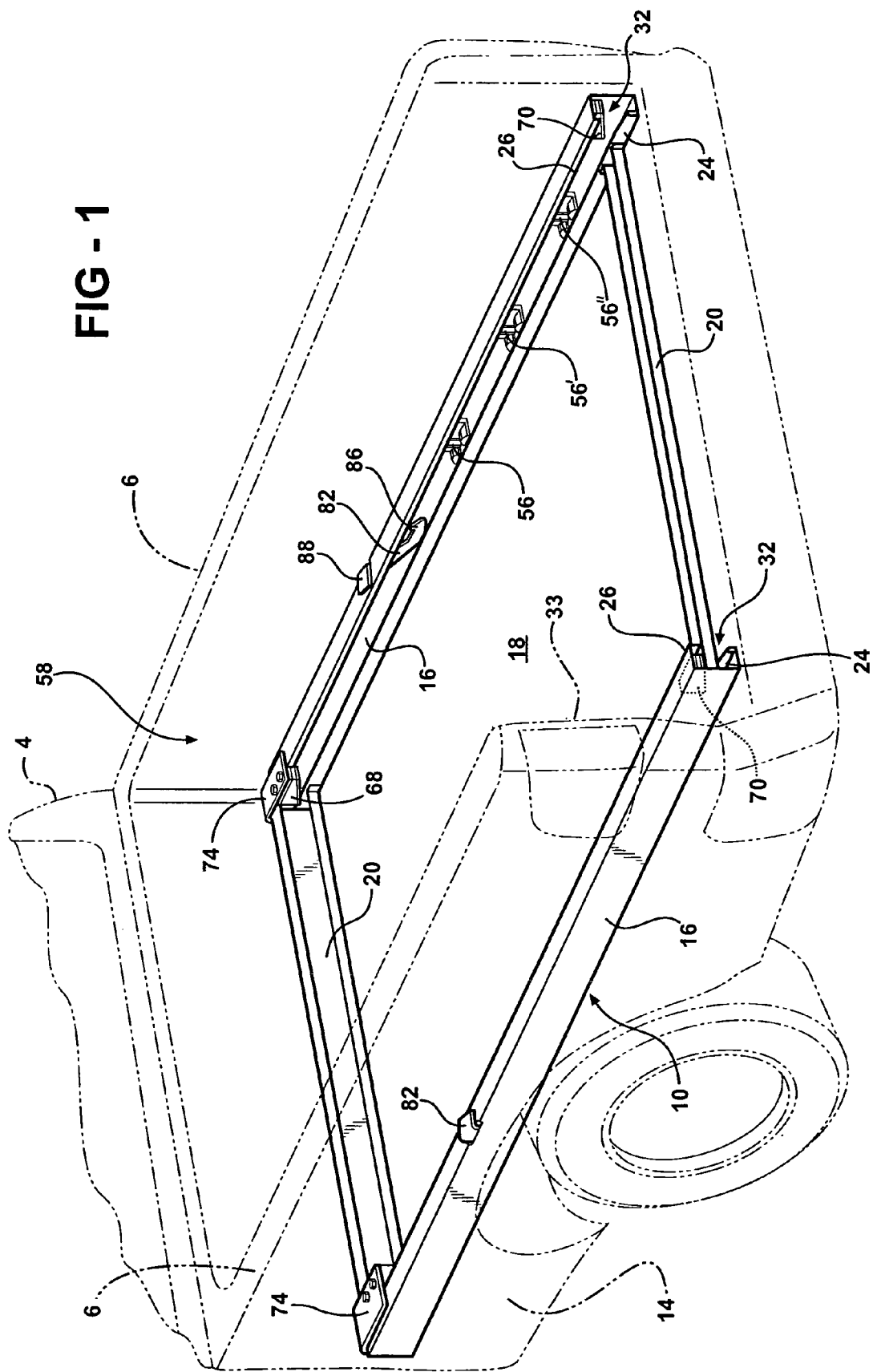
FIG. 1 is a schematic perspective view of a support track of a sliding load floor assembly according to the present invention mounted within a vehicle cargo area.

Referring to FIG. 1, a vehicle 14 includes a cab 4 and two opposing side walls 6. A support frame 10 for a sliding load floor assembly 12 (shown assembled in FIGS. 3a and 3b) includes two longitudinally oriented support rails 16 fixedly connected to a cargo floor 18 of the vehicle 14. The support rails 16 may be releasably attached to the cargo floor 18, or permanently fixed to the cargo floor 18, such as by riveting or welding. The support rails 16 are generally parallel and spaced apart from one another, and are interconnected by at least one cross-member 20.

The support rails 16 are generally C-shaped, and each support rail 16 includes a lower flange 24 and an upper flange 26. The lower flanges 24 extend vertically upward and extend the length of the rails 16. The upper flanges 26 extend vertically downward and extend the length of the rails 16. The upper and lower flanges 26, 24 of each rail define a gap 30 therebetween, the gap 30 extending the length of the respective rail 16. Each rail 16 also defines a channel 32 open at the corresponding gap 30.

The side walls 6 and floor 18 cooperate to at least partially define a cargo area 58 and a rear tailgate opening 33. The support frame 10 is within the cargo area 58 of the vehicle 14, in this case a pickup truck bed. While the vehicle 14 shown is a pickup truck, it should be appreciated that the present invention may be utilized in any vehicle having a cargo area, such as a minivan, sport-utility vehicle, etc., without changing the inventive concept. Additionally, it should also be noted that the support rails 16 could be oriented laterally for use with a vehicle having a side door opening without changing the inventive concept.

Figure 2:
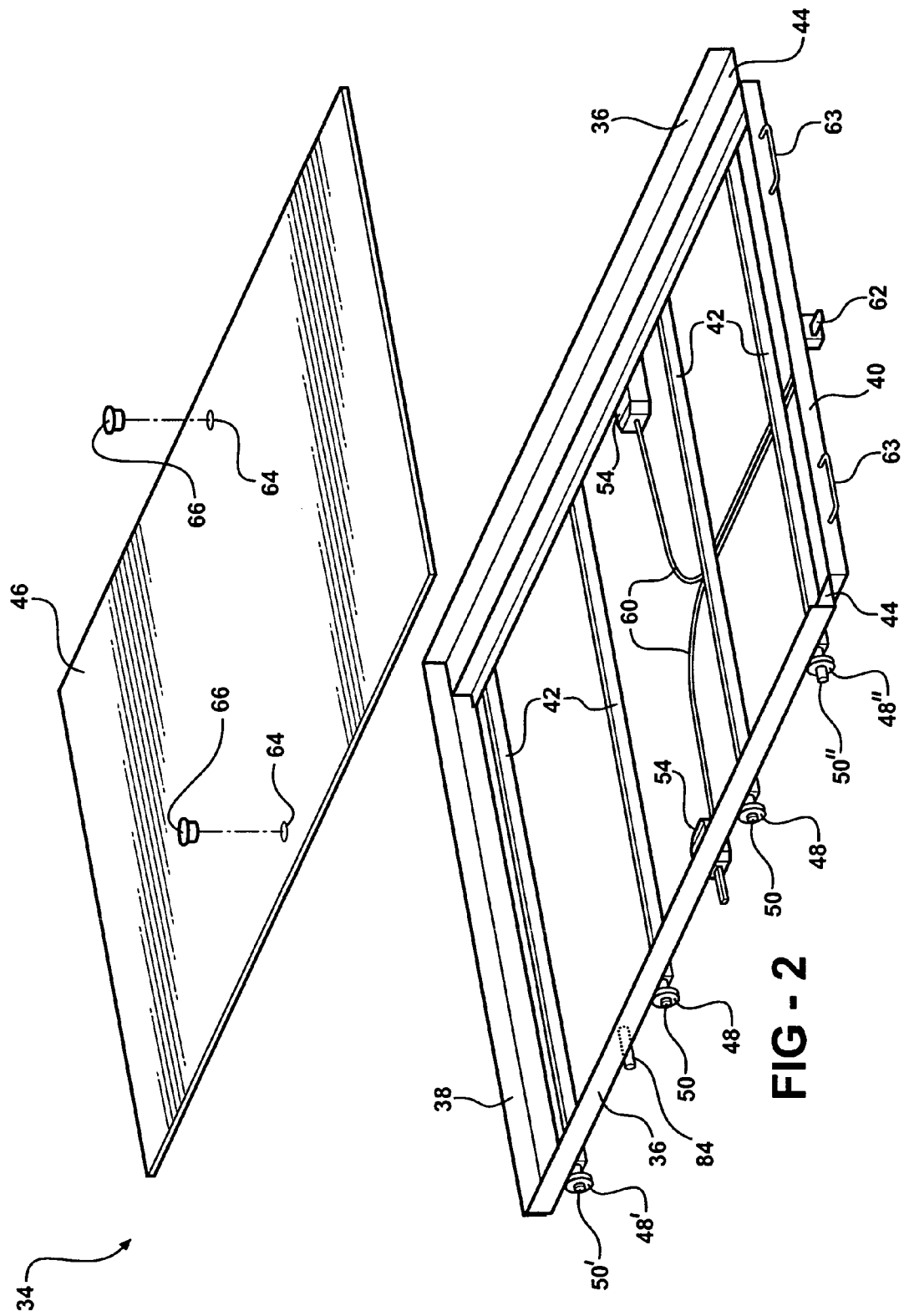
FIG. 2 is a schematic perspective view of a sliding platform of the sliding load floor according to the present invention.
Figure 3A:
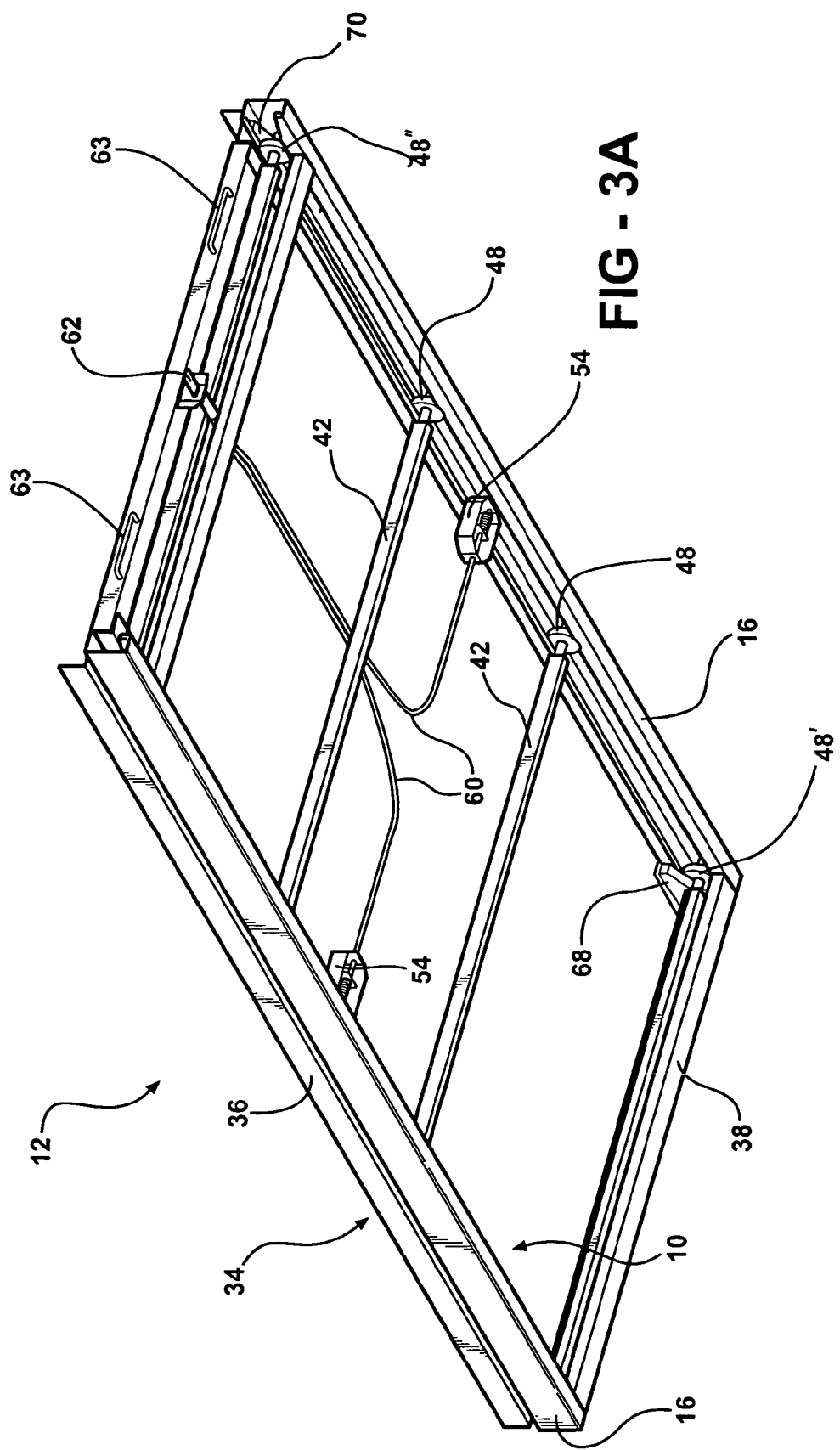
FIG. 3a is a schematic underside perspective view of the sliding load floor according to the present invention in a stowed position.
Figure 3B:
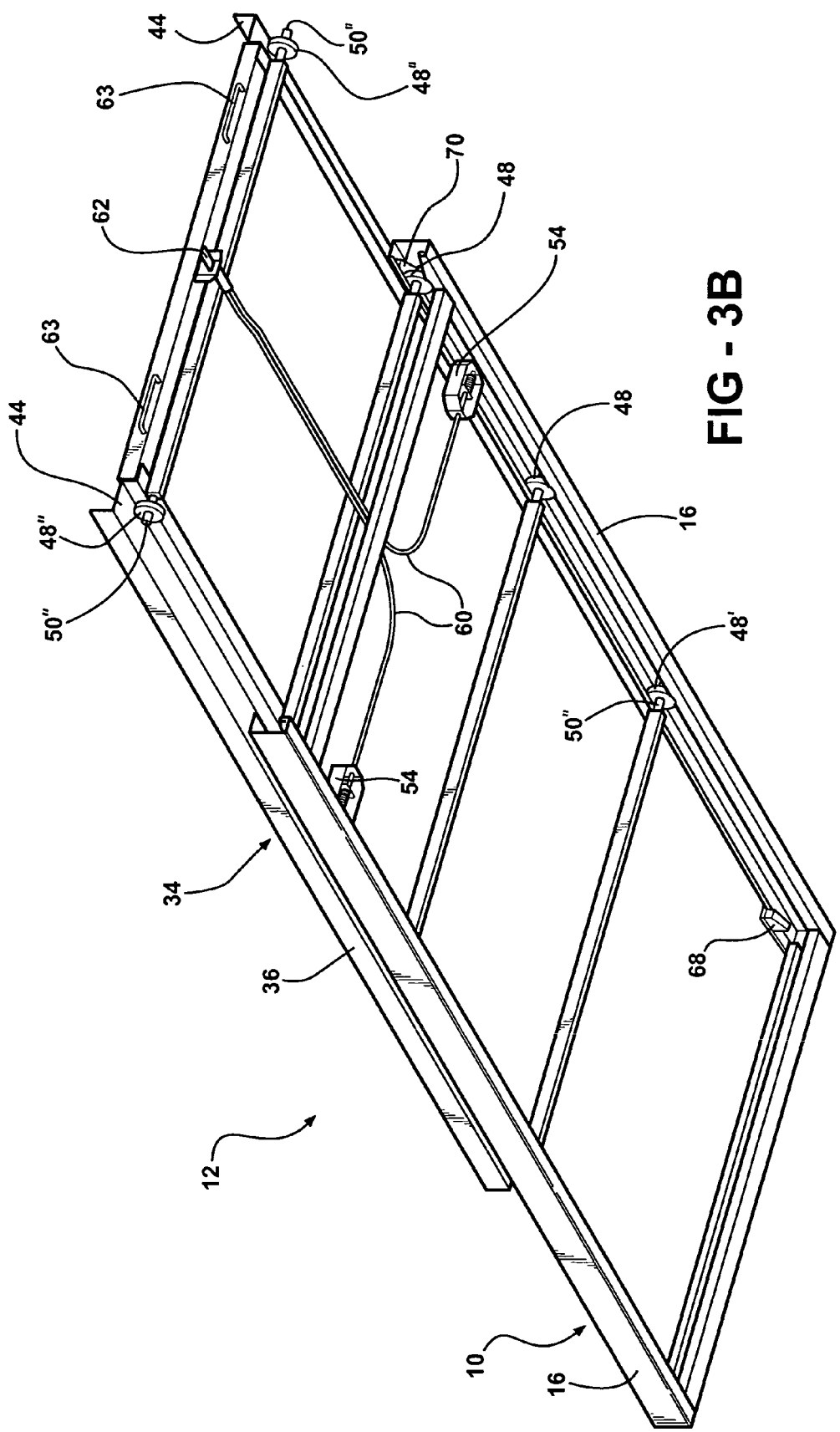
FIG. 3b is a schematic underside perspective view of the sliding load floor of FIG. 3a in an extended position.

Referring to FIG. 2, a platform is generally shown at 34. The platform 34 comprises a pair of platform rails 36 generally parallel and spaced apart from one another, and interconnected by a front cross-member 38, a rear cross-member 40, and a plurality of intermediate cross-members 42. The platform rails 36 each include an overhang portion 44. The platform 34 includes a plurality of rollers 48, 48', 48", each roller being rotatably connected to a respective intermediate cross-member 42. The rollers 48, 48', 48" are rotatable about axles 50, 50', 50". The rollers 48, 48', 48" are configured to seat within the gap 30 between the lower and upper flanges 24, 26 on the support rails 16 to slidably attach the sliding platform 34 to the support frame 10 as shown in FIGS. 3a and 3b. Each roller 48, 48', 48" defines a groove 52, as shown for roller 48" in FIG. 4. Lower and upper flanges 24, 26 are at least partially within the grooves 52 when the sliding load floor assembly 12 is assembled so that the flanges 24, 26 form a track. Under typical operation, the rollers roll along the upper surface of the lower flange 24. Cooperation of the grooves 52 with the lower and upper flanges 24, 26 limits vertical and transverse motion of the sliding platform 34 by physical part interference while allowing fore and aft translation of the sliding platform 34 with respect to the vehicle.

Since the lower flange 24 extends vertically upward from the support rails 16, disposing the rollers 48, 48', 48" on lower flange 24 elevates the sliding platform 34 above the cargo floor 18. Thus debris on the cargo floor 18 will not interfere with operation of the rollers 48, 48', 48". Furthermore, any debris that falls on the support rails 16 will tend not to collect on the flanges 24, 26, but instead will fall below to the cargo floor 18 where it will not interfere with the movement of the rollers along the lower flange. Moreover, each overhang portion 44 extends over a respective one of the rails 16, thereby preventing debris from falling onto the track formed by the flanges 24, 26. In the event that debris does accumulate within the support rails 16, the channel 32 is preferably open in the rear of the cargo area at the tailgate opening, thereby allowing easy access for cleaning, for example, by spraying water from a hose into the channel 32.

As shown in FIG. 2, a pair of latches 54 are connected to the sliding platform 34. As shown in FIG. 1, a plurality of detent members 56, 56', 56" are connected to the support rails 16 within the channel 32. Each latch 54 is selectively engageable with one of the detent members 56, 56', 56" to restrict fore and aft translation of the sliding platform 34 with respect to the support frame 10. In the preferred embodiment, detent members 56, 56', 56" lock the sliding platform 34 in stowed, midway, and extended positions respectively. For example, in the stowed position (FIG. 3a), the latches 54 engage detent members 56 such that the sliding platform 34 rests substantially within the vehicle cargo area.

In contrast, in the extended position (FIG. 3b), the latches 54 selectively engage detent member 56" such that the sliding platform 34 extends beyond the vehicle cargo area through the tailgate opening. In the extended position, rear rollers 48" no longer seat between lower and upper flanges 24, 26 and the platform 34 is in a cantilevered condition. Upper flanges 26 counteract upward forces on the sliding platform 34 in the extended position caused by the cantilevered condition. That is, rollers 48, 48' contact the upper flanges 26, and the upper flanges 26 restrict upward movement of the platform 34.

Figure 4:
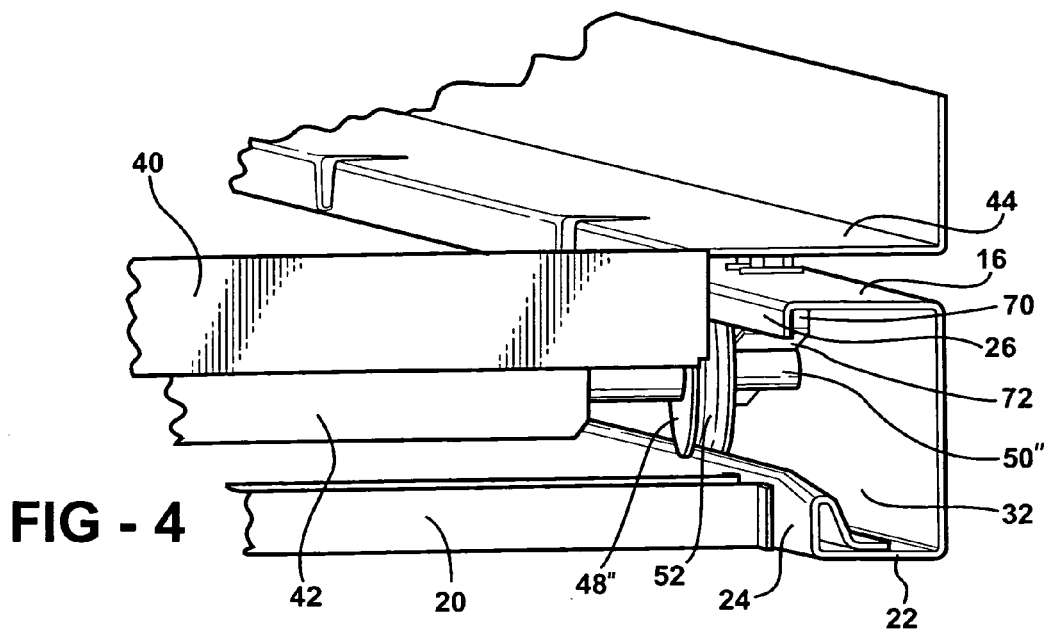
FIG. 4 is a schematic perspective view of a portion of the sliding load floor of FIGS. 3a and 3b.

The lower flange 24 is inclined, i.e., ramps downward, at the rear of the vehicle, as best shown in FIG. 4, to assist in the return of the rear rollers 48" to the lower and upper flanges 24, 26 as the sliding platform 34 moves from the extended position (FIG. 3b) to the stowed position (FIG. 3a).

A pair of cables 60 operatively connect to a respective latch 54 at one end and to a latch release 62 at the other end. To disengage the latches 54 from the detent members 56, 56', 56", a force is applied to the latch release 62, either by operator effort or by mechanical means. The cables 60 transmit the force to the latches 54 to withdraw the latches 54 from the detent members 56, 56', 56". Handles 63 disposed on the rear cross-member 40 may then be used to slide the sliding platform 34 rearward along the support frame 10. Any latches 54 or detent members 56, 56', 56" known in the art may be utilized without compromising the inventive concept.

Access holes 64 extend through the load floor 46 to allow access to the latches 54 in the event of latch failure, thereby allowing latch disengagement without using the latch release 62. Plugs 66 removably seal the access holes 64 to prevent accumulation of debris on the support rails 16.

Referring to FIGS. 1, 3a and 3b, front and rear compliant wedges 68, 70 control shake and rattle of the sliding platform 34 when in the stowed position. A pair of front compliant wedges 68 are disposed near the front of the sliding load floor assembly 12, with one front compliant wedge 68 adjacent each support rail 16. A pair of rear compliant wedges 70 are disposed near the rear of the sliding load floor assembly 12, with one rear compliant wedge 70 seated within each channel 32.

Referring to FIG. 4, wherein like reference numbers refer to like components from FIGS. 1–3b, a rear compliant wedge 70 preferably comprises rubber or other elastomeric material, and preferably includes a metal plate 71 bonded thereto to form an inclined ramp surface 72. As the platform 34 is translated from the extended position to the stowed position, the axle 50" that supports rear roller 48" contacts the ramp surface 72. As the platform 34 is moved forward, the axle 50" compresses wedge 70, which in turn exerts a corresponding reaction force on the axle 50". Since the ramp surface 72 is inclined, the reaction force has a vertical, i.e., downward, component that acts on the axle and, correspondingly the platform 34 and the roller 48" so that the roller 48" maintains contact with the lower flange 24. The wedge 70 thus reduces or eliminates relative vertical movement of the platform 34 with respect to the support frame 10 that may, for example, be caused by vehicle movement on rough terrain.

Referring again to FIG. 2, axles 50, 50' do not protrude sufficiently outboard of the platform 34 to contact the rear compliant wedges. Thus the rear compliant wedges 70 affect only the rear axles 50" when the sliding platform 34 is in the stowed position, while allowing the other axles 50 to pass by the rear compliant wedges 70 during movement between the stowed and extended positions as necessary without interference therefrom.

Figure 5:
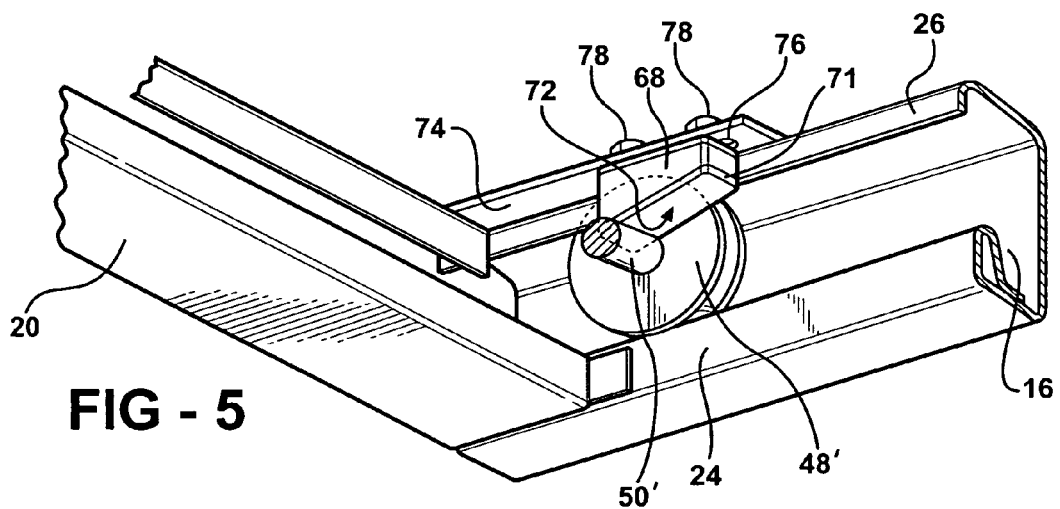
FIG. 5 is a schematic perspective view of a portion of the sliding load floor of FIGS. 3a and 3b.

Referring to FIG. 5, support brackets 74 are connected to the top rear of the support rails 16, and support the front compliant wedges 68 inboard of the upper flange 26 and outside of the channel 32. Thus, rear compliant wedges 70 are outboard of the front compliant wedges 68. The front compliant wedges 68 are sufficiently positioned and configured to contact the forward axles 50' inboard of rollers 48' as the platform is translated to its stowed position. The front compliant wedges 68 act on axles 50' in the same manner that the rear wedges act on axles 50" to maintain contact between rollers 48' and the lower flanges 24.

The brackets 74 preferably define adjustment slots 76 with bolts 78 extending therethrough to attach the front compliant wedges 68 to the wedge plates 74, and to fine tune the amount of compression by the front compliant wedges 68 on the front axles 50'. If an operator desires less shake and rattle, the front compliant wedges 68 may be adjusted rearward with respect to the vehicle by loosening the bolts 78, sliding the front compliant wedges 68 with respect to the adjustment slots 76, and retightening the bolts 78. Conversely, if the front compliant wedges 68 seem to unnecessarily restrain movement of the sliding platform 34 into the stowed position, the front compliant wedges 68 may be adjusted forward with respect to the vehicle. An adjustment slot may also be utilized with the rear compliant wedges 70 to permit similar adjustment.

Figure 6:
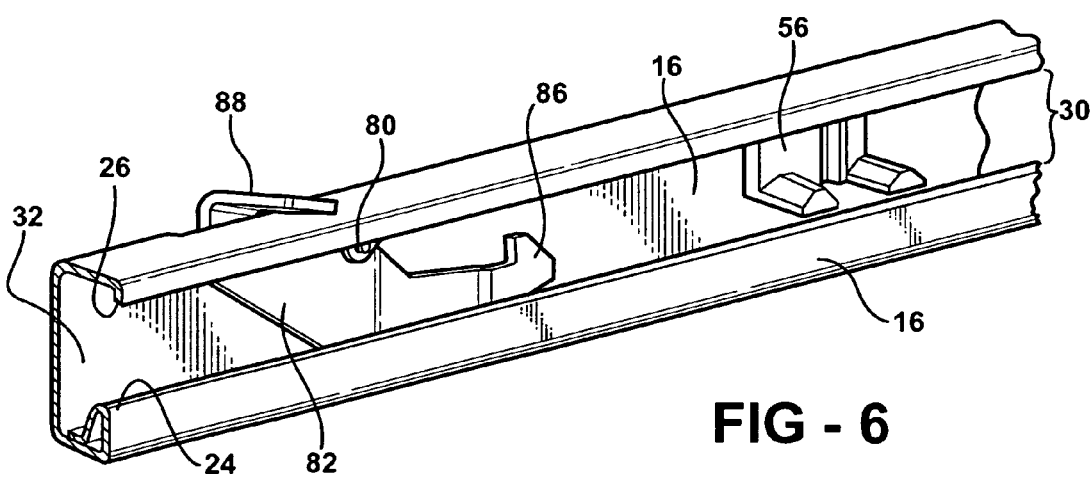
FIG. 6 is a schematic perspective view of a portion of the support track of FIG. 1.

Referring to FIG. 6, a pin 80 pivotally attaches a latch member 82 to the support rail 16 forward of detent member 56. A stop pin 84 extends from the sliding platform 34, as shown in FIG. 2. The latch member 82 includes a hook 86 integrally formed therewith and located within the channel 32. The hook 86 is offset from the rest of the latch member 82, protruding slightly into the channel 32 to catch the stop pin 84, thereby preventing extension of the sliding platform 34 beyond the extended position. That is, the stop pin 84 has clearance along the latch member 82 as the sliding platform 34 moves with respect to the support frame 10, but then intereferes with the offset hook 86 to prevent extension of the sliding platform 34 beyond the extended position. The latch member 82 further includes a finger 88. The sliding platform 34 may be removed from the support frame 10 by pulling the finger 88 to pivot the latch member 82 such that the offset hook 86 rotates downward. The stop pin 84 can thus pass by the latch member 82 without interference from the hook 86. When the sliding platform 34 is again placed within the support frame 10, the overhang portion 44 pushes the finger 88 to pivot the latch member 82 back to an operative position. This feature ensures that the latch member 82 cannot be inadvertently left unset.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. For example, the rollers could extend from the support platform, with the upper and lower rolling surfaces attached to the sliding platform, without changing the inventive concept. It is, therefore, to be understood that within the scope of the appended claims, the invention may be practiced in a substantially equivalent way other than as specifically described herein.

The invention claimed is:

1. A sliding load floor assembly for a motor vehicle comprising:
    a sliding platform including a load floor;
    a support rail mountable within the vehicle and including
        a lower flange extending substantially vertically upward; and
    a roller rotatably mounted with respect to said sliding platform, said roller defining a groove;
    wherein said lower flange is at least partially within said groove to support said roller and to facilitate selective translation of said sliding platform along said support rail between a stowed position and an extended position.

2. The sliding load floor assembly of claim 1 wherein said support rail further includes an upper flange extending substantially vertically downward therefrom, with said roller at least partially between said upper flange and said lower flange.

3. The sliding load floor assembly of claim 2 wherein said upper flange is at least partially within said groove.

4. The sliding load floor assembly of claim 1 further comprising a wedge configured to exert a vertical force upon a portion of said sliding platform when said sliding platform is in the stowed position, thereby preventing movement of said roller to reduce vibration of said load floor.

5. The sliding load floor assembly of claim 4 wherein said wedge is selectively movable fore and aft to selectively vary the vertical force exerted upon said sliding platform.

6. The sliding load floor assembly of claim 1 further including a stop pin extending from said sliding platform, and a latch member disposed on said support rail, with said latch member configured to engage said stop pin when said sliding platform is in the extended position to prevent overextension of said sliding platform.

7. The sliding load floor assembly of claim 6 wherein said latch member is selectively pivotable with respect to said support rail when said sliding platform is in said extended position to disengage said stop pin and thereby allow removal of said sliding platform from said support rail.

8. The sliding load floor assembly of claim 7 wherein said latch member includes a portion extending above said support rail, and is configured to automatically reset when said sliding platform returns to said support rail.

9. The sliding load floor assembly of claim 1, further comprising a latch operatively connected to said platform to selectively lock the platform with respect to the rail; wherein said load floor defines an access hole positioned substantially over the latch to allow access to the latch.

10. The sliding load floor assembly of claim 1, wherein said lower flange is inclined at one end of said support rail.

11. A vehicle comprising:
    a vehicle body including a body floor and defining a cargo area and a body opening;
    a platform;
    a rail mounted with respect to the body floor and including a first flange extending substantially vertically; and
    a roller defining a groove and rotatably mounted with respect to said platform such that the roller is rotatable about a substantially horizontal axis, said first flange being partially located within said groove such that said first flange supports said platform above the body floor and said platform is selectively translatable between a stowed position in which the platform is entirely located within the cargo area forward of the body opening and an extended position in which at least a portion of the platform protrudes outside the cargo area from the body opening.

12. The vehicle of claim 11 wherein said platform includes a portion extending over at least a portion of said rail.

13. The vehicle of claim 11 wherein said rail is generally C-shaped and defines a channel.

14. The vehicle of claim 13 wherein said channel is open at the body opening, thereby allowing access to said channel for debris removal.

15. A vehicle comprising:
    a body defining a cargo area and a body opening;
    a generally C-shaped support rail mounted to the body and having a lower flange and an upper flange spaced a distance apart from one another;
    a sliding platform;
    first and second axles operatively connected to the sliding platform;
    a first roller rotatable about said fist axle and at least partially between said upper and lower flanges; a second roller rotatable about said second axle and at least partially between said upper and lower flanges;
    the platform being selectively translatable between a first position and a second position relative to the support rail;
    a first wedge sufficiently configured and positioned to selectively exert a vertical force upon said first axle and a second wedge configured to selectively exert a vertical force upon said second axle when the platform is in the first position and not in the second position.

16. The vehicle of claim 15 wherein said second axle extends further outboard than said first axle; and wherein said second wedge is further outboard of said first wedge.

* * * * *